April 26, 1966 G. B. SPEEN 3,247,760
OPTICAL APPARATUS FOR TESTING THE ACCURACY OF
QUADRIC SURFACES
Filed Dec. 7, 1962 4 Sheets-Sheet 1

INVENTOR.
GERALD B. SPEEN
BY Philip M. Bolton
ATTORNEY

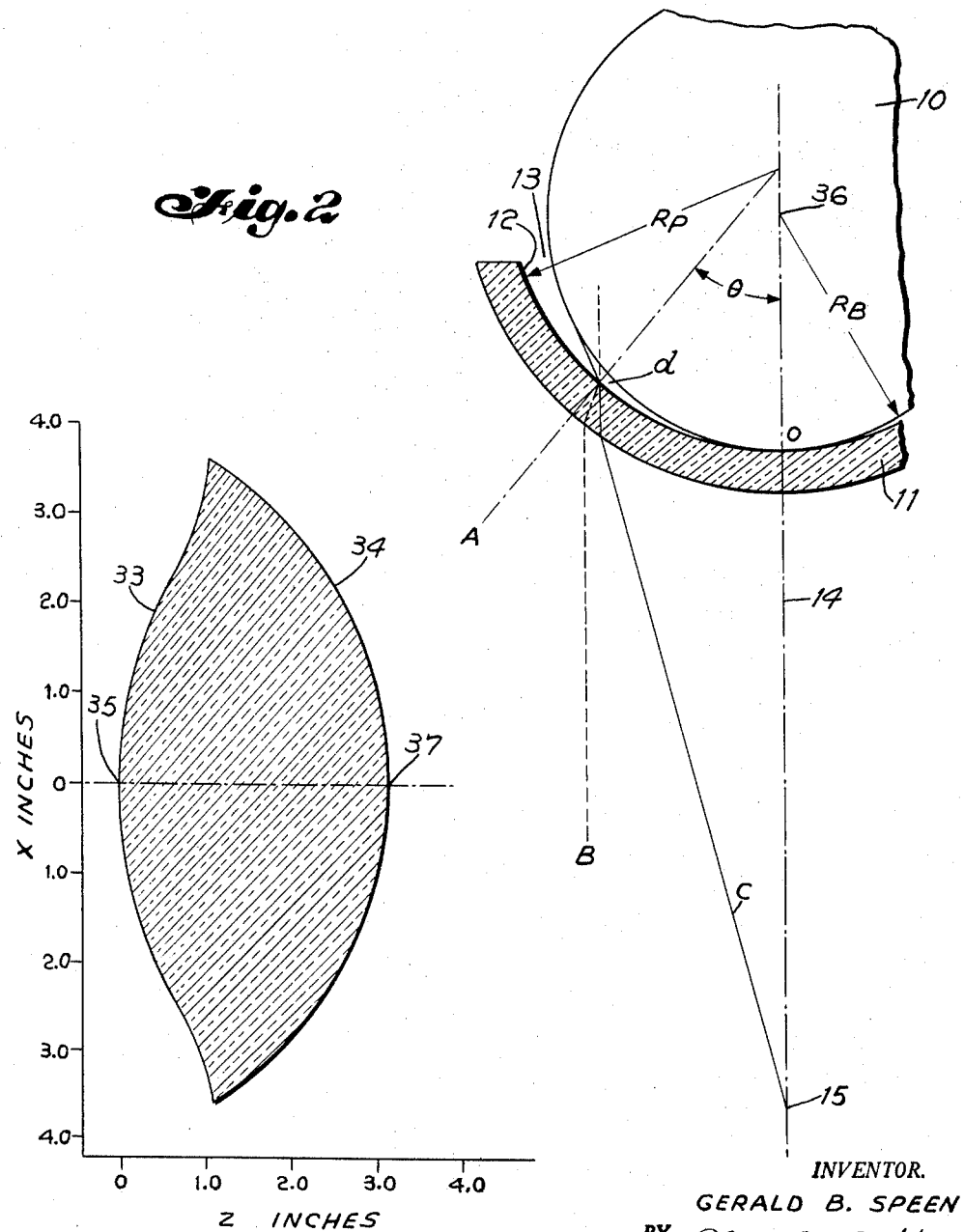

April 26, 1966  G. B. SPEEN  3,247,760
OPTICAL APPARATUS FOR TESTING THE ACCURACY OF
QUADRIC SURFACES
Filed Dec. 7, 1962  4 Sheets-Sheet 3

INVENTOR.
GERALD B. SPEEN
BY Philip M. Bolton
ATTORNEY

April 26, 1966  G. B. SPEEN  3,247,760
OPTICAL APPARATUS FOR TESTING THE ACCURACY OF
QUADRIC SURFACES
Filed Dec. 7, 1962  4 Sheets-Sheet 4

INVENTOR.
GERALD B. SPEEN
BY Philip M. Bolton
ATTORNEY

United States Patent Office 3,247,760
Patented Apr. 26, 1966

3,247,760
OPTICAL APPARATUS FOR TESTING THE ACCURACY OF QUADRIC SURFACES
Gerald B. Speen, Sepulveda, Calif., assignor to International Telephone and Telegraph Corporation, Nutley, N.J., a corporation of Maryland
Filed Dec. 7, 1962, Ser. No. 243,141
16 Claims. (Cl. 88—14)

This invention relates generally to inspection apparatus, and more particularly to apparatus for inspecting and evaluating the accuracy of a quadric surface of a member, i.e., a second order curved surface of revolution such as a spherical, parabolic or hyperbolic surface or the like.

In the manufacture of super-precision navigational instruments, there is a requirement for the precise evaluation of spheres and spherical surfaces to determine their sphericity, i.e., constancy of radius, to accuracies, on the order of a few millionths of an inch. Complete evaluation of such surfaces requires complete knowledge of the entire surface; all surface irregularities and deviations in the radius larger than a few millionths of an inch must be capable of detection. A similar requirement exists for evaluation of other quadric surfaces which are not truly spherical. It is therefore desirable to provide an instrument capable of full area evaluation of either transparent or opaque quadric surfaces with precise accuracy. It is further desirable that such instrument be characterized by its relative simplicity, ease of operation, and capability of completing a full area evaluation with a minimum number of readings.

Sir Isaac Newton observed the phenomenon of dark rings surrounding the point of contact of a convex lens with a plane surface; these rings or interference fringes, referred to as "Newton's rings," are caused by light interference between rays of light emanating from the convex surface and from the plane surface. Newton's rings have been employed for evaluating a spherical surface by placing the spherical surface in contact with an optically flat surface; when viewing the optical flat normally under diffuse monochromatic light, the number and circularity of the rings or fringes appearing in the gap between the spherical surface and the flat surface may be used to determine the radius of curvature and the uniformity of the spherical surface. This method, however, permits observation of only a very small area of the spherical surface and is useful only with spherical surfaces having an extremely long radius: In order to enlarge the area of observation and to provide fewer fringes in the field of view, a concave test plate has been employed having an inner radius of curvature only slightly larger than that of the surface being evaluated, thus providing a narrower and radially longer wedge-shaped gap between the two surfaces; such a method is described in Patent Number 674,951 to Ernst Abbe. This method is more suitable for surfaces having a shorter radius of curvature; however, if the radius of the concave test plate is only slightly larger than the precise dimension required, the observed pattern will contain far too many fringes to be useful and on the other hand, if the radii of the test plate and the surface being evaluated are too closely matched, the parts become difficult to assemble and disassemble because of the trapped air film, dust, optical contacting, etc.

Further and most important, it is still possible to observe only a relatively small area of the surface being evaluated at any one time due to the curvature effects, to be hereinafter more fully described.

It is accordingly an object of the invention to provide improved apparatus for evaluating the accuracy of a quadric surface.

Another object of the invention is to provide improved apparatus for evaluating the accuracy of a quadric surface which permits observation of a substantially larger surface area than has heretofore been possible.

In accordance with the broader aspects of the invention, there is provided a test member having a quadric surface to be evaluated and another member likewise having the quadric surface, one of the surfaces being convex and the other concave and with the members being disposed with a convex surface within the concave surface and with the major axes of the surfaces coincident on a common axis. The two surfaces diverge outwardly from the common axis thereby to define a narrow, generally wedge-shaped gap between the surfaces. At least one of the members is transparent and means are provided for illuminating the gap with monochromatic light so that a plurality of generally circular light interference fringes appear in the gap concentric with the common axis. Lens means are provided disposed concentrically on the common axis for receiving normal light rays emanating from the gap and for rendering the same into a flat image so that light rays emanating from a large area of the gap may be observed.

The above mentioned and other features and objects of this invention and the manner of attaining them will become more apparent and the invention itself will be best understood by reference to the following description of an embodiment of the invention taken in conjunction with the accompanying drawings, wherein:

FIG. 2 is a diagram showing the cross-sectional shape of the double aspheric lens employed in the apparatus of FIG. 1;

FIG. 3 is an enlarged fragmentary cross-sectional view of the sphere and spherical test plate useful in explaining the invention;

Figure 1:
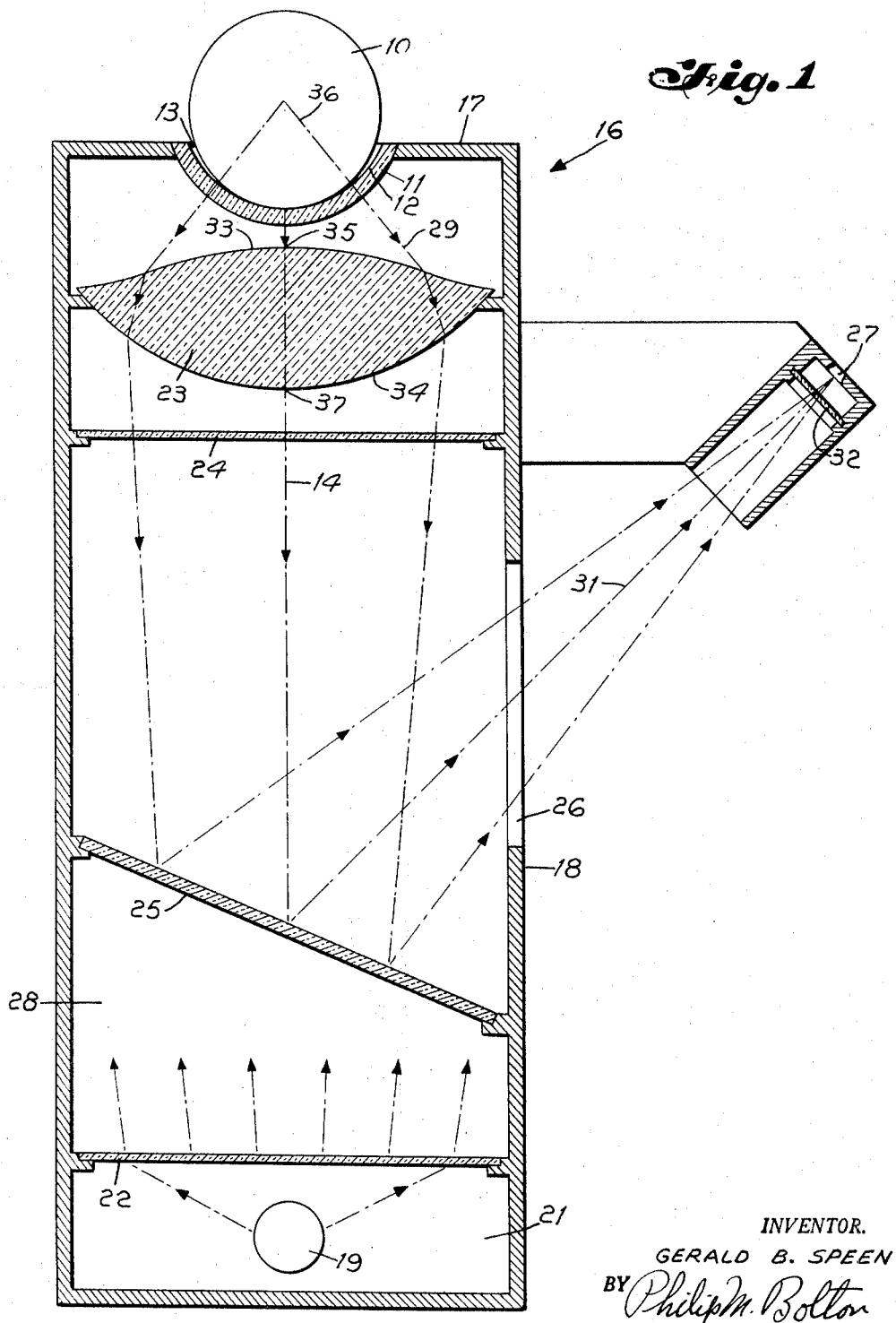
FIG. 1 is a diagrammatic cross-sectional view of the apparatus of the invention.

Referring now to FIG. 3 of the drawings, a sphere 10 is shown supported with a transparent test plate 11 having a spherical inner surface 12 and being of constant thickness. The radius $R_p$ of the spherical surface 12 of the test plate 11 is slightly larger than the radius $R_B$ of the sphere 10. It will thus be seen that the exterior surface of the sphere 10 and the spherical surface 12 of test plate 11 diverge from the point of contact 0 of sphere 10 and test plate 11 to define a narrow, generally wedge-shaped gap or air film 13.

If the gap 13 is flooded with diffuse monochromatic light, a plurality of progressively larger diameter interference fringes will appear in the gap 13 concentric with the axis 14 of the sphere and test plate 11, a dark interference fringe or ring appearing in each area of the gap 13 where the thickness of the gap is an integral multiple of one-half the wave length of the illuminating light.

A knowledge of the thickness of the gap 13 at some point and of the radius $R_p$ of the test plate 11 defines the radius $R_B$ of the sphere 10 according to the equation:

$$R_B = \frac{2R_p(R_p - d)(1 - \cos \theta) + d^2}{2R_p - 2 \cos \theta(R_p - d)}$$

where $\theta$ is the angle defined between common axis 14 and a line A normal to the spherical surface 12 of test plate 11.

For any given angle $\theta$ the number of interference rings or fringes existing between the point $d$ and the axis 14 defines the thickness $d$ of the gap 13 since, as indicated above, one fringe appears at each integral multiple of one-half a wave length of the light source; approximately 10.7 microinches (0.27 micron) in the case of a mercury green line light source of 5461 Angstrom units. This relationship, however, is valid only for observations of light rays emanating normal to the gap 13, such as ray A in FIG. 3; only normal rays will accurately represent thickness of the gap 13 at any point. If all normal rays could be observed, a quantity of circular rings or fringes $n$ would be seen according to the equation:

$$n = \frac{d(\text{inches} \times 10^6)}{10.7}$$

With the eye located at infinity on the axis 14, it will be observed that the length of light ray B is considerably longer through the gap 13 than in the case of the normal ray A. If the eye is brought closer, for example, to point 15 on axis 14, it will be seen that the length of ray C through the gap 13 is still longer than the length of ray B or the length of normal ray A. As pointed out above, as the effective thickness of the gap 13 (along an observed light ray) increased, the number of observed fringes also increased; thus, with the eye placed on the axis 14 at any reasonable distance from test plate 11, for a reasonably sized angle $\theta$ of observation, for example 45° (a conical field of observation of 90°), the number of fringes which would be observed will be so large as to make critical observation of the full surface area within the 90° cone impractical. Furthermore, the above expression for the number of fringes no longer holds since the number of fringes observed is an indication of true gap thickness only in the case of normal rays.

It will be seen that with the eye placed at point 15 along axis 14, the fringe-crowding effect increases progressively toward the outer edge of the field of view. Thus, the observer at point 15 would see widely spaced fringes in the central area adjacent axis 14 where the effective gap thickness is not severely changed by the non-normal light rays, with the fringes becoming progressively closer together and becoming more numerous near the edge of the field. Thus, with prior methods for evaluating quadric surfaces employing observation of interference fringes, only a relatively small central area concentric with the optical axis of observation could be usefully employed.

It will be seen that the degree of circularity and the concentricity of the interference fringes with the axis of observation indicates the smoothness of the surface and also its sphericity. In order properly to evaluate the surface, only areas with a reasonably small number of fringes can be employed; evaluation is most readily accomplished when the area of observation contains no more than ten fringes and no less than four fringes. Furthermore, in order to keep the number of observations to effect a complete evaluation of the sphere as small as possible, the angle $\theta$ should be as large as possible while still maintaining a desirable number of fringes; a 50° solid angle ($\theta = 25°$) covers approximately 4.7% of the entire surface of the sphere and would thus require approximately 70 readings or observations in order adequately to evaluate entire surface area of the sphere, whereas a 90° solid angle ($\theta = 45°$) covers approximately 15.7% of the surface area and requires only 22 observations.

It will now be seen that in order to obtain accurate and useful data for adequate surface evaluation of the sphere, it is necessary to observe all of the normal rays emanating from a large area of the gap whereas the unaided eye can essentially observe only a single light ray emanating normally from the gap. In accordance with the invention, therefore, a lens system is provided which permits observation of all of the normal light rays emanating from a substantial area by rendering the spherical surface essentially flat.

Referring now to FIG. 1 of the drawings, the improved inspection apparatus of the invention, generally identified at 16 comprises transparent test plate 11 having a spherical inner surface 12 of a constant thickness, mounted in the upper end 17 of tubular housing member 18. A source 19 of diffuse monochromatic light, such as a mercury vapor lamp, is mounted adjacent the bottom end 21 of the tube 18. A light-diffusing plate 22, such as an opal glass plate, extends across housing 18 above the monochromatic light source 18 in order further to diffuse the light.

In the illustrated embodiment, a double aspheric lens 23 is supported in the tube 18 concentric with axis 14 of the sphere 10 and the test plate 11 and spaced from the outer surface of test plate 11, as shown. A recticle 24, to be hereinafter more fully described, extends transversely across housing 18 between the lens 23 and the diffusing plate 22. A half-silvered or beam splitting mirror 25 is supported within housing 18 at an angle, as shown. An opening 26 is provided in the side of housing 18 and a viewing aperture 27 is supported on the side of the housing 18 for viewing the image reflected by the mirror 25.

The diffuse monochromatic light from the light source 19, as indicated by the arrows 28, travels upwardly through the beam splitting mirror 25, recticle 24, lens 23, and the transparent test plate 11, thus illuminating the gap 13; the light 28 being diffuse is substantially unaffected by lens 23, i.e. the light which illuminates gap 13 is still diffuse and monochromatic. The normal light rays 29 reflected from the exterior surface of sphere 10 and the surface 12 of test plate 11 are received by the lens 23 and bent in such a way that they converge at the aperture 27 with the fixed pattern on reticle 24 being superimposed thereon. The image produced by lens 23 impinges upon beam splitting mirror 25 and is reflected thereby along optical axis 31 through the aperture 26 in housing 18 to the viewing aperture 27 which is located concentrically with the optical axis 31. A suitable filter 32 may be provided for rendering the observed fringe pattern sharper.

It will now be seen that interference fringes localized in the inter-surface air film of gap 13, rendered into suitably flattened image by lens 23 are observed through the viewing aperture 27 with the fixed pattern of reticle 24 superimposed thereon.

In a specific embodiment of the invention for evaluating spheres made from a wide variety of materials, such as Pyrex and fused quartz and having a radius of approximately 1.688 inches, the criterion of a sphere was that its surface deviate from perfect sphericity by more than one-fifth fringe (about two-millionths of an inch); absolute radius of the spheres was not critical within a range of 1.688 inches±five fringes (about eleven-millionths of an inch) being acceptable. In this specific embodiment, test plates 11 made from both Pyrex and quartz were employed, having a thickness of approximately .375 inch and an inner radius $R_p$ of 1.693 inches. In this specific embodiment, the lens 23 had a cross-sectional configuration as shown in FIG. 2 with its thickness dimensions taken from FIG. 2 being shown in the chart below:

| Front surface 33 | | Second surface 34 | |
|---|---|---|---|
| X inches | Z inches | X inches | Z inches |
| 0 | 0 | 0 | 0 |
| .105755 | .002518 | .101985 | .001406 |
| .212171 | .010062 | .203957 | .005626 |
| .301297 | .020092 | .305905 | .012660 |
| .401037 | .035075 | .394873 | .021102 |
| .494666 | .052461 | .499386 | .033768 |
| .596591 | .074667 | .602929 | .049253 |
| .695714 | .099144 | .698510 | .066152 |
| .802524 | .128245 | .802016 | .087285 |
| .900559 | .157050 | .875979 | .104198 |
| .992447 | .185559 | .986867 | .132400 |
| 1.108075 | .223109 | 1.086332 | .160620 |
| 1.190911 | .250925 | 1.220148 | .202981 |
| 1.297428 | .287553 | 1.301565 | .231244 |
| 1.400429 | .323654 | 1.414690 | .273670 |
| 1.500675 | .359288 | 1.485173 | .301976 |
| 1.598720 | .394275 | 1.584810 | .344466 |
| 1.694979 | .428795 | 1.708258 | .401181 |
| 1.789770 | .462788 | 1.795002 | .443762 |
| 1.903572 | .504538 | 1.904168 | .500597 |
| 1.998900 | .537345 | 2.007014 | .557501 |
| 2.090408 | .569626 | 2.104461 | .614474 |
| 2.203831 | .609235 | 2.197222 | .671516 |
| 2.293925 | .640329 | 2.307435 | .742915 |
| 2.405875 | .678457 | 2.391558 | .800112 |
| 2.494988 | .708366 | 2.492244 | .871704 |
| 2.605917 | .745011 | 2.607256 | .957758 |
| 2.694351 | .773734 | 2.698798 | 1.029588 |
| 2.804575 | .808897 | 2.804048 | 1.115925 |
| 2.892545 | .836435 | 2.904779 | 1.202418 |
| 3.002295 | .870115 | 3.001433 | 1.289066 |
| 3.089957 | .896467 | 3.094380 | 1.375869 |
| 3.199402 | .928666 | 3.198545 | 1.477334 |
| 3.308735 | .960042 | 3.298505 | 1.579011 |
| 3.396143 | .984549 | 3.394613 | 1.680899 |
| 3.505354 | 1.014442 | 3.500115 | 1.797601 |
| 3.592701 | 1.037765 | 3.601358 | 1.914578 |

This lens was formed from heavy flint glass having an index of refraction of 1.617 and the lens was positioned with the vertex 35 of its front surface 33 located 2.25 inches from the center 36 of the sphere 10. The viewing aperture 27 was located approximately 24.7 inches from the vertex 37 of the back side 34 of the lens 23.

Figure 7:
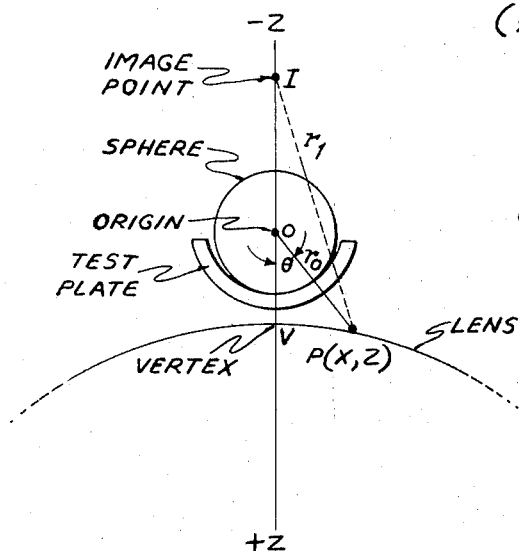
FIG. 7 is a diagram used in explaining how the co-ordinates of the double aspheric lens were calculated.

The coordinates of the two surfaces of the double aspheric lens were calculated in the following manner:

(1) The optical path length must be constant so that $$N_0\sqrt{X^2+Z^2}+N_1\sqrt{X^2+(Z-a)^2}=C$$

where $N_0$ is the index of refraction before the surface
$N_1$ is the index of refraction after the surface
$Z$ is the distance measured from the origin along the optical axis
$X$ is the perpendicular distance from the optical axis
$a$ is the distance of the image point from the origin When $X=0$ $$N_0 A + N_1(a-A) = C \qquad (1)$$

where $A$ is the distance of the vertex of the lens to the origin (2) Using the diagram of FIGURE 7

*For first surface*

Set: $A = 2.25''$ ($A = \overline{OV}$ = distance from origin to vertex)
$a = -7.5''$ ($a = \overline{OI}$ = distance from origin to image point)
$N_0 = 1.00$ (index of refraction of air)
$N_1 = 1.617$ (index of refraction of glass in lens)

From Equation 1, using above values, determine the optical path length $C$. That is:

$N_0 A + N_1(a - A) = C$
$(1.00)(2.25) + (1.617)(-7.5 - 2.25) = C$
$C = -13.51575$ for first surface Equation 1 may be rewritten in general by referring to the diagram above $$N_0 r_0 + N_1 r_1 = C$$

Thus $$r_1 = \frac{C - N_0 r_0}{N_1} \qquad (2)$$

$$r_1 = \frac{-13.51571 - r_0}{1.617} \text{ for first surface} \qquad (2a)$$

Consider now the triangle $\overline{IOP}$ in the diagram. By the law of cosines $r_1^2 = a^2 + r_0^2 - 2ar_0(\pi - \theta)$
$r_1^2 = a^2 + r_0^2 + 2ar_0 \cos\theta$ $$r_0 \cos\theta = \frac{r_1^2 - a^2 - r_0^2}{2a} \qquad (3)$$

Noting that $r_0 \cos\theta$ = the Z-component of the coordinate P, since $$Z = r_0 \cos\theta$$

then $$Z = \frac{r_1^2 - r_0^2}{2a} - \frac{a^2}{2a}$$

$$Z = \frac{r_1^2 - r_0^2}{2a} - \frac{a}{2} \qquad (4)$$

Using the value of $a = -7.5$ $$Z = -\frac{r_1^2 - r_0^2}{15} + 3.75 \text{ for the first surface} \qquad (4a)$$

Now, to find the X-component of the coordinate of P, use the equation $$X = \sqrt{R_0^2 - Z^2} \qquad (5)$$

To find the coordinates of a series of points describing the first surface, therefore, Equations 2, 4 and 5 are used. Arbitrary values of $r_0$ are chosen starting with 2.25 and X and Y are calculated. In other words, the chosen value of $r_0$ is used in Equation 2a to calculate $r_1$. This value of $r_1$ is then used in Equation 4a to calculate Z. The Z is used in Equation 5 to find X. Increasing values are chosen for $r_0$ and the coordinates X and Y are calculated in each case until enough points are found to describe the surface of the lens adequately. This is very conveniently done on a digital computer taking small increments for $r_0$. The points shown in the table were obtained in this manner.

*Second surface*

For the second surface, the image point I becomes the object and a similar procedure is followed as for the first surface. Letting the final image point be +30 inches from the origin, and allowing for mechanical factors (strength of lens, room for mounting at edge, etc.) the thickness of the lens along the optical axis is determined. This is done by following the previously described procedure and adjusting values until the second surface intersects the first surface at the desired point. This results in a thickness of 3.044'' at the center.
Thus:

$A = 12.794''$ (distance from object to vertex of second surface = 7.5 + 2.25 + 3.044)
$a = 37.5''$ (distance from object to image point = 30 + 7.5'')
$N_0 = 1.617$ (index of refraction of glass in lens)
$N_1 = 1.00$ (index of refraction of air)

From Equation 1
$N_0 A + N_1(a - A) = C$
$(1.617)(12.794) + (1.00)(37.5 - 12.794) = C$
$C = 45.393898$ (for second surface)

Equation 4 is then $$r_1 = \frac{C - N_0 r_0}{N_1} = \frac{(45.393898) - (1.617)r_0}{1.00}$$

$r_1 = 45.393898 - 1.617 r_0$ (for second surface) (2b)

Equation 4 is then $$Z = \frac{r_1^2 - r_0^2}{2a} - \frac{a}{2}$$

$$Z = \frac{r_1^2 - r_0^2}{75} - 18.75 \quad \text{(for second surface)} \quad (4b)$$

This allows the calculation of X from Equation 5 as before.

In this case $r_0 = 12.794''$ is the maximum value of $r_0$. Therefore, in choosing arbitrary increments of $r_0$, they must be such as to *decrease* $r_0$. Again, this is best done by digital computer, as was the case in obtaining the points on the table.

Smaller sized spheres can be tested with this lens by placing and operating the sphere with its center at the origin. On the other hand, a smaller diameter lens can be designed which will have the same first surface, but a different lens thickness is chosen. This thickness is chosen so as to make the two surfaces meet at a radius large enough to accept the limiting ray from the sphere. Larger spheres may also be tested this way, but a new lens would have to be designed with the origin farther from the lens, thus allowing room for the greater diameter of the spheres. However, the same procedure would be followed.

Thus, in general, to design a lens, the sphere radius (maximum size) is added to the test plate thickness and, allowing a small air gap, "A" is chosen. Then "$a$" is chosen (or may be scaled from the example given above as proportional to radius). The first surface is then calculated by (1) find C from Equation 1
(2) find $r_1$ from Equation 2 for arbitrary values of $r_0$
(3) find Z from Equation 4
(4) find X from Equation 5.

The second surface is then calculated trying various lens thicknesses so that the limiting ray can be obtained. (The limiting ray is the outer ray which is defined by what conical angle is used to define the surface area of the sphere to be observed. In this case I used 90° solid angle or $\theta = 45°$. Therefore, $\theta = 45°$ defines the limiting ray. If one wishes to look at a larger surface area in one observation, the angle $\theta$ must be increased.) Once the thickness is established by sample calculations, the exact coordinates for the second surface are then calculated as before.

While both the front and back sides 33, 34 of the lens 23 are aspheric in the specific embodiment, it will readily be comprehended that the back side 34, which is nearly spherical, may be made spherical with a corresponding increase in asphericity of the front side 33. It will further be readily comprehended that other lens systems incorporating either a single lens or a combination of lenses may be employed for rendering the normal light rays emanating from the gap 13 into an essentially flat field or image. As a matter of fact, a lens system using only regular spherical surfaces can also be designed to do this. For example, test plate 11, instead of being of constant thickness as shown, may be of variable thickness thus forming one element of a lens system.

Figure 5:
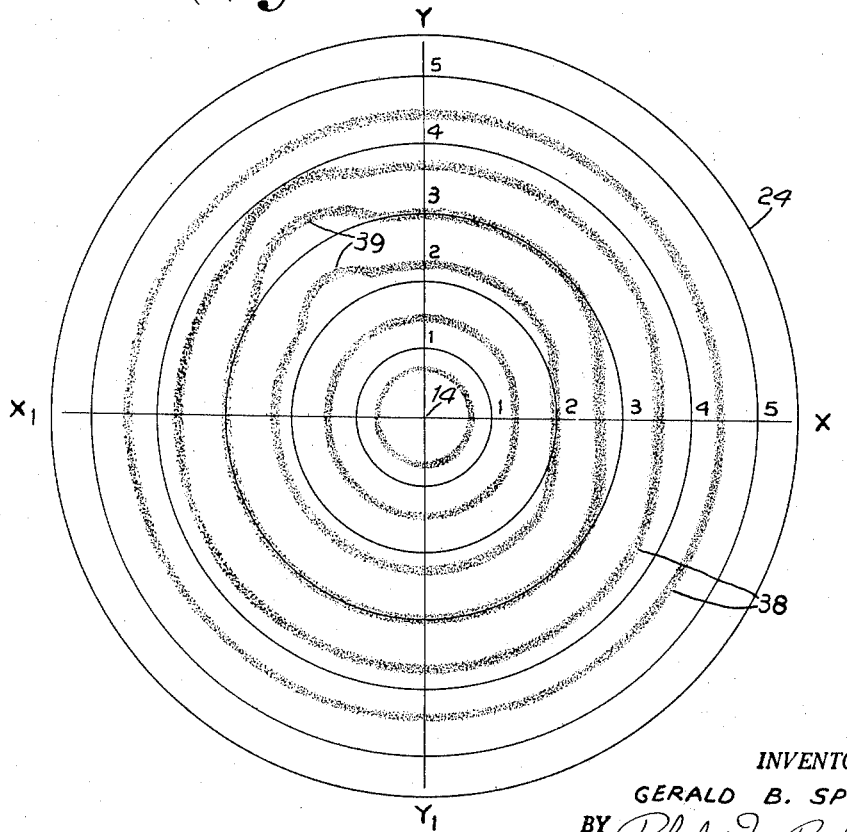
FIG. 5 is a view showing a typical fringe pattern obtained with the apparatus of the invention.

Referring now additionally to FIG. 5, the reticle 24 is formed of transparent material, such as Pyrex or plastic and has inscribed thereon radially spaced reference circles numbered from "1" to "5." Reticle 24 is positioned in housing 18 so that the center of the reference circles is concentric with the axis 14. It will be seen that these circles serve as references from which deviations from the circularity in the fringe pattern can be estimated with accuracy of the order of one-fifth of a fringe. Two reference axes X and Y are also inscribed on the reticle 24 thus defining four quadrants so the observer can readily locate any deviations in the fringe pattern.

While any monochromatic light source may be employed such as a mercury vapor or sodium arc lamp, in the specific embodiment, a monochromatic sodium yellow line source was provided by a sodium arc lamp catalog number 87300 manufactured by Central Scientific Co. providing light of 5889–5895 Angstrom units and a monochromatic mercury green line source was provided by a mercury arc lamp catalog number 87298 of Central Scientific Co. providing light of 5461 Angstrom units.

Figure 4:
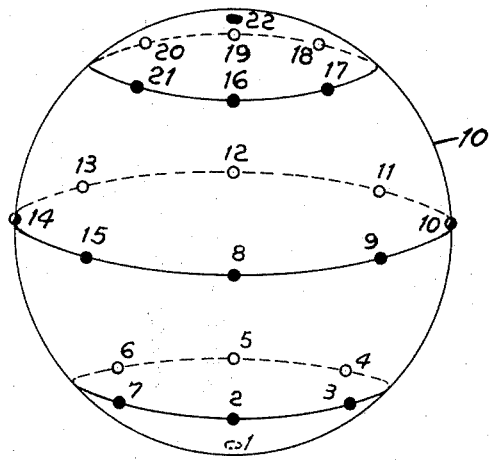
FIG. 4 is a diagrammatic view illustrating the procedure for evaluating the entire surface area of a sphere with the apparatus of the invention.

In order to evaluate the entire surface area of the sphere 10, the sphere is placed in the test plate 11 and the significant characteristics of the fringe pattern are observed and recorded using the reticle pattern as a guide. The sphere is then lifted and rotated to the next observation point, and replaced in the test plate for the next observation, this procedure being repeated until the entire surface area has been evaluated. In the case of the specific embodiment of the invention, wherein a 90° solid angle is observed, a total of 22 check or observation points may be employed to evaluate the entire sphere with adequate overlaps in each observed area. Checking of the entire spherical surface is facilitated by employing a predetermined sequence of test points as shown in FIG. 4, with the employment of the 22 check points shown in FIG. 4, the sphere will be observed the equivalent of more than three times to reveal very reliable data.

When the sphere 10 is placed within the test plate 11 as above-described, the interference fringes 38 together with the superimposed reticle pattern will be observed through the viewing aperture 27, as shown in FIG. 5. When the observed interference fringes are perfectly circular, the portion of the surface of the sphere 10 being viewed is a section of a perfect sphere, assuming that the surface 12 of the test plate 11 is perfectly spherical. A simple check can be made to determine whether a deviation in the circularity of one or more fringes is attributable to an imperfection in the surface 12 of the test plate or in the surface of the sphere by merely rotating the sphere slightly in the test plate; the position of the deviation will shift with sphere rotation if the non-uniformity is on the surface of the sphere, but will remain stationary if it is due to an imperfection in the test plate.

When the sphere 10 is placed in the test plate 11, an air film is produced in the gap 13 which may vary in thickness with successive set-ups; this variation in the thickness of the air film will produce a corresponding variation in the number of fringes observed as though the radius of curvature of the sphere had changed. However, if two adjacent overlapping areas show different numbers of perfectly circular interference fringes, surely no change in curvature can exist and the surface must therefore be continuously spherical. In general, the parameter of primary interest is sphericity and thus only the uniformity of the fringes is of significance. If, in addition to sphericity, absolute radius is also of significance, means may be provided for adjustably supporting the sphere so that the same number of fringes is seen with each observation, or so that the center of the sphere is always at the same point. In the first instance, adjustments of the location of the sphere (with its center always on the axis 14) to produce the same number of fringes will provide an indication of sphericity, whereas in the latter case, the number of fringes produced is an indication of absolute radius. In this connection, it will be seen that it is not necessary that the sphere be in contact with the test plate as shown in FIGS. 1 and 3. Thus, while with the apparatus shown in FIGS. 1 and 3, a different sized test plate must be employed for spheres having any appreciable difference in radius, provision of means for adjustably supporting the sphere within the test plate permits the employment of the same test plate with spheres having a wider range of radii.

Referring still to FIG. 5, the reticle pattern above-described, provides the basis on which to judge deviations of the fringes from true circles and to locate them for reference purposes. Thus, the outward bulges 39 of about one-half fringe in the third and fourth fringes indicates a high spot of about one-quarter wave length, i.e., five-millionths of an inch, on the surface of the sphere. On the other hand, the flattened portions 41 on the third, fourth, and fifth fringes indicates a surface depression covering a fairly large area on the surface of the sphere.

Figure 6A:
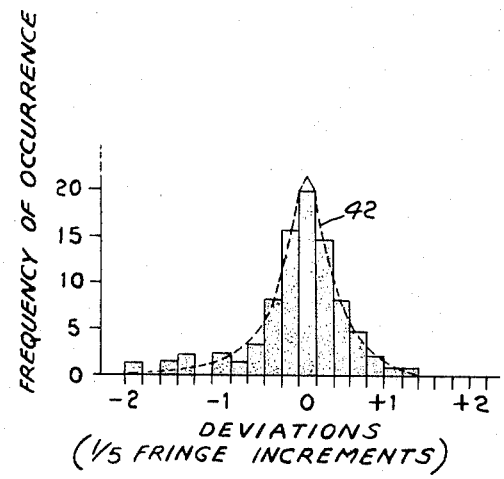
FIGS. 6A and 6B illustrate histogram plottings of data obtained with the apparatus of the invention and used to evaluate such data.
Figure 6B:
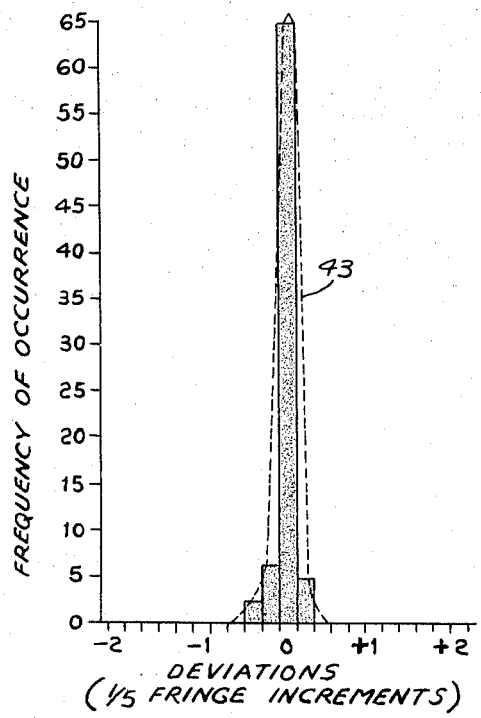

In order to evaluate the sphericity of the sphere, deviations of one-fifth fringe or more are recorded at each of the check points and the data may then be plotted in histogram presentation form, as shown in FIG. 6, in order to obtain a rapid visual appraisal of the sphericity of the sphere. The horizontal axis of the histogram is divided into units of spacing corresponding to one-fifth fringe deviations, the zero deviations being plotted in the center with positive deviations (surface bulges) being plotted at the right and negative deviations (surface depressions) being plotted to the left. The vertical height of each column corresponds to the number of deviations of that magnitude occurring in a complete set of observations. A smooth curve, as shown by the dashed lines 42 and 43 in FIGS. 6A and B serves as a convenient means of visual appraisal of the sphericity; the more peaked the curve, the more spherical the surface. Thus, FIG. 6A shows data plotted from a sphere in the early stages of its fabrication, the wide low curve 42 showing that the sphere at this stage of completion contains a relatively large number of deviations from sphericity. The data plotted in FIG. 6B was obtained after further working of the sphere and the highly peaked curve 43 indicates that there are now very few surface deviations.

While an apparatus for evaluating the sphericity of a complete sphere has been shown and described, it will be readily apparent that the sphericity of a member having a surface which is only a section of a sphere may be evaluated with the same apparatus and with the same techniques. It will further be seen that the apparatus is not restricted to the evaluation of spherical surfaces, but is equally applicable to the evaluation of any second order quadric surface, i.e., a curved surface of revolution, such as a spheroid, paraboloid, hyperboloid, etc. For the evaluation of such surfaces, it is required that the major axes of the surface being evaluated and the test plate be coincident along the optical axis 14. Assuming that parabolic surfaces were to be evaluated, either a spherical or a parabolic test plate may be employed and it will further be seen that the circles inscribed on the reticle 24 may be calibrated within the apparatus so they indicate whether the surface being evaluated in fact, has the proper parabolic curvature; the reticle circles may have a predetermined radial spacing and the conformance of the parabolic surface to the desired parabolic curvature may be evaluated by comparing the spacing of the interference fringes with the spacing of the reticle circles.

It will now be seen that with the employment of prior methods for evaluating quadric surfaces, particularly the sphericity of a sphere, examination of the surface over its entire area required a prohibitively large number of overlapping observations, such evaluation being further complicated by the difficulty in correlating the data from adjacent readings. The improved apparatus of the invention substantially reduces the number of required observations to a number sufficiently small for practical data taking and reliable data acquisition. Thus, in the particular case of a sphere, the apparatus of the invention makes it possible to inspect and reliably evaluate the entire surface of a sphere to a tolerance of about two-millionths of an inch with only 22 readings. The apparatus of the invention not only can detect broad and generalized surface deviations, but also small and localized surface irregularities; with the apparatus, it is possible accurately to determine the location, shape, size, and depth or height of each deviation and with such data, it is now possible to judge the quality of a spherical or other quadric surface with assurance and reliability. It will further be seen that the apparatus is characterized by its simplicity and ease of operation.

While I have described above the principles of my invention in connection with specific apparatus, it is to be clearly understood that this description is made only by way of example and not as a limitation to the scope of my invention.

What is claimed is:

1. Apparatus for evaluating the accuracy of a quadric surface of a member comprising: a test member having a quadric surface to be evaluated; another member having a quadric surface; one of said surfaces being convex and the other concave, said members being disposed with said convex surface within said concave surface and with the major axes of said surfaces coincident on a common axis, said surfaces diverging outwardly from said axis thereby to define a generally wedge-shaped gap between said surfaces; said other member being transparent; means for illuminating said gap with monochromatic light whereby a plurality of generally circular light interference fringes appear in said gap concentric with said axes; having lens means having at least one aspherical surface disposed concentrically on said axis for receiving normal light rays emanating from said gap and for rendering the same into an essentially flattened image whereby light rays emanating from a large area of said gap may be observed.

2. The apparatus of claim 1 further comprising means for viewing said image disposed on an optical axis coincident with said common axis.

3. The apparatus of claim 1 wherein at least one of said surfaces is spherical.

4. The apparatus of claim 1 wherein the surface of said test member is convex.

5. The apparatus of claim 1 wherein said lens means is disposed on the side of said other member remote from said test member.

6. The apparatus of claim 1 wherein the surface of said test member is convex, and wherein said lens means is disposed on the side thereof remote from said test member.

7. The apparatus of claim 6 wherein said other member is of uniform thickness.

8. The apparatus of claim 1 further comprising reticle means disposed on the side of said lens means remote from said members for superimposing a predetermined fixed pattern on said image.

9. The apparatus of claim 1 wherein said test member is a sphere and the surface of said other member is spherical, said other member being of uniform thickness, said lens means being disposed on the side of said other member remote from said test member.

10. Apparatus for evaluating the accuracy of a convex quadric surface of a member comprising: a test member having a convex quadric surface to be evaluated; another member having a concave quadric surface; said members being disposed with said convex surface within said concave surface and with the major axes of said surfaces coincident on a common axis, said surfaces diverging outwardly from said axis thereby to define a generally wedge-shaped gap between said surfaces; said other member being transparent; a source of monochromatic light spaced from said other member on the side thereof remote from said test member for illuminating said gap whereby a plurality of generally circular light interference fringes appear in said gap concentric with said axis; lens means having at least one aspherical surface disposed concentrically on said axis between said light source and said other means for receiving normal light rays emanating from said gap and for rendering the same into an essentially flattened image whereby light rays emanating from a large area of said gap may be observed; and beam splitting mirror means extending across said axis between said source and said lens means for transmitting said light to said gap and for reflecting said image along an optical axis defining an angle with said common axis.

11. The apparatus of claim 10 further comprising viewing means disposed on said optical axis and spaced from said mirror means.

12. The apparatus of claim 10 further comprising reticle means extending across said common axes between said mirror means and said lens means for superimposing a predetermined fixed pattern of radially spaced rings concentric with said common axis on said image thereby to evaluate the constancy of circularity of said interference fringes.

13. The apparatus of claim 10 wherein said test member is a sphere and wherein said concave surface is spherical and said other member is of constant thickness.

14. The apparatus of claim 1 wherein said illuminating means comprises a mercury green line source.

15. The apparatus of claim 1 wherein said surfaces are proportioned to provide radially spaced circular interference fringes in said gap when said surface of said test member is accurately formed.

16. The apparatus of claim 1 wherein said illuminating means comprises a solid yellow line.

References Cited by the Examiner
UNITED STATES PATENTS 2,648,250  8/1953  Zobel _____ 88—14
3,028,782  4/1962  Bernhardt et al. _____ 88—14

FOREIGN PATENTS 602,459  4/1948  Great Britain.

JEWELL H. PEDERSEN, *Primary Examiner.*

KATHLEEN H. CLAFFY, *Examiner.*

J. G. BOLTEN, *Assistant Examiner.*